(12) United States Patent
van Dijk

(10) Patent No.: US 9,331,866 B2
(45) Date of Patent: May 3, 2016

(54) NETWORK COMMUNICATIONS APPARATUS, SYSTEM, AND METHOD

(75) Inventor: Luc van Dijk, Kranenburg (DE)

(73) Assignee: NXP B.V., Eindhoven (NL)

( * ) Notice: Subject to any disclaimer, the term of this patent is extended or adjusted under 35 U.S.C. 154(b) by 785 days.

(21) Appl. No.: 13/452,201

(22) Filed: Apr. 20, 2012

(65) Prior Publication Data

US 2013/0282941 A1    Oct. 24, 2013

(51) Int. Cl.
| | |
|---|---|
| H04L 12/40 | (2006.01) |
| H04L 12/403 | (2006.01) |
| H04L 29/12 | (2006.01) |
| G06F 13/14 | (2006.01) |
| G06F 13/38 | (2006.01) |

(52) U.S. Cl.
CPC .......... *H04L 12/403* (2013.01); *H04L 61/2038* (2013.01); *G06F 13/14* (2013.01); *G06F 13/38* (2013.01); *H04L 2012/40234* (2013.01)

(58) Field of Classification Search
CPC ......... G06F 13/40; G06F 13/00; G06F 13/14; G06F 13/38; H04L 12/403
USPC ................................................. 710/110, 316
See application file for complete search history.

(56) References Cited

U.S. PATENT DOCUMENTS

| | | | | |
|---|---|---|---|---|
| 4,443,866 A | * | 4/1984 | Burgiss, Sr. .................... | 710/100 |
| 4,484,087 A | * | 11/1984 | Mazin et al. .................... | 377/79 |
| 4,815,026 A | * | 3/1989 | Barbu et al. .................... | 710/100 |
| 4,935,868 A | * | 6/1990 | DuLac .......................... | 710/305 |
| 6,882,046 B2 | | 4/2005 | Davenport et al. | |
| 6,920,576 B2 | | 7/2005 | Ehmann | |
| 6,985,986 B2 | * | 1/2006 | Boles et al. .................... | 710/262 |
| 7,091,876 B2 | | 8/2006 | Steger | |
| 7,884,744 B2 | | 2/2011 | De Haas et al. | |
| 7,937,516 B2 | * | 5/2011 | Muth ........................... | 710/305 |
| 8,649,336 B2 | * | 2/2014 | Tazzari et al. ................. | 370/329 |
| 2006/0020377 A1 | | 1/2006 | Goetz et al. | |
| 2007/0291887 A1 | * | 12/2007 | Ishimoto ....................... | 375/371 |
| 2013/0073761 A1 | * | 3/2013 | Nierop et al. ................. | 710/110 |

FOREIGN PATENT DOCUMENTS

| | | |
|---|---|---|
| DE | 102008044777 A1 | 3/2010 |
| EP | 1490772 B1 | 6/2003 |

OTHER PUBLICATIONS

Burr Brown, ISO 102, ISO 106 Signal Isolation Buffer Amplifiers, Datasheet, Burr Brown Corporation, 1995.
LIN Specification Version 2.0, LIN Consortium of Munich, Germany, Sep. 23, 2003.
Extended European Search Report for Patent Appln. No. 13164003.9 (Feb. 4, 2016).

* cited by examiner

*Primary Examiner* — Henry Tsai
*Assistant Examiner* — Christopher A Daley
(74) *Attorney, Agent, or Firm* — Rajeev Madnawat

(57) ABSTRACT

In one embodiment, a communication circuit is configured for automated addressing in a network of series connected communication circuits. The communication circuit includes a voltage source and a switch connected in parallel between first and second data ports of the circuit. While operating in an addressing mode, a first voltage is sampled from a first data port while the switch is closed. The switch is opened to provide a voltage potential between the first and second data port and a second voltage is sampled from the second data port. An address of the communication circuit in the network is determined based on a difference of the first and second voltages.

25 Claims, 5 Drawing Sheets

NETWORK COMMUNICATIONS APPARATUS, SYSTEM, AND METHOD

Aspects of the present disclosure relate to the addressing of communication devices in a communication network. A variety of communication networks are used in different applications and environments. For example, industrial, automotive, and other industries have used communications networks to facilitate the control of and/or communication between various devices. These communications have been increasingly used to suit various needs. In particular, the automotive industry has seen increased use of network communications for a variety of uses, such as for controlling communication circuits relating to the operation of a vehicle.

One type of communication network that is being increasingly used for various applications is a LIN (local interconnect network). A LIN includes a master and a number of slaves connected in a series cascade arrangement for communication over a single wire interface. The interface is low-cost because it is a single wire interface and based on a standard UART (Universal Asynchronous Receiver Transmitter). The network is time-triggered and controlled by one master circuit that contains a scheduler and multiple slaves that synchronize their local oscillator to the first part of the message (header) sent by the master. Then the slave ("addressed" by the header) completes the message by inserting the response field.

In many applications, multiple unaddressed communication circuits may be connected in the same network. An address assignment procedure may be needed to be executed in order to provide all devices on the network with a unique address, which can be correlated to a physical position of the device in the network.

These and other issues continue to present challenges to the implementation of circuits in a variety of applications, and in particular to applications utilizing a master-slave type of network such as a LIN.

Aspects of the present disclosure relate to the addressing of communication circuits in a communication network. In one embodiment, a communication circuit is configured for automated addressing in a network of series connected communication circuits. The communication circuit includes a voltage source and a switch connected in parallel between first and second data ports of the circuit. The switch is operated in a first conductive state to provide a first parameter at the second data port, and operated in a non-conductive state to effect a change at the second data port from the first parameter to a second parameter. For instance, when the switch is in the non-conductive state, the voltage source creates a voltage potential between data ports. When the switch is in the conductive state, the switch provides a low resistance path between the data ports and removes a voltage potential of the voltage source between the two data ports. An addressing circuit assigns an address in the network to the communication circuit based on a first voltage of the first data port when the switch is in the conductive state and a second voltage of the second data port when the switch is in the non-conductive state.

In some embodiments, an apparatus configured for automated addressing in a network of series connected communication circuits is provided. The apparatus includes a switching circuit configured to operate in a communication mode and an addressing mode. In the communication mode, the switching circuit communicates information carried by data signals between a first data port and a second data port. For instance, in one embodiment, the switching circuits provide a conductive path between the first and second data ports, while operating in the communication mode, to form an unbroken signal path 158 that may be used as a bus to transmit signals between the master and slave circuits. While operating in the addressing mode, the switching circuit receives a first information signal that represents a cascade of slave circuits (e.g., the number of slave circuits in communication mode) between the master communication circuit and the first data port on the signal line. The switching circuit (e.g., 164 and 184) sends a second information signal to the next slave circuit in the network. The second information signal represents a cascade of slave circuits (e.g., the number of slave circuits in communication mode) between the master communication circuit and the next slave circuit in the network.

In some embodiments, a daisy-chain network of communication circuits is provided. The network includes a master communication circuit and a plurality of slave communication circuits. The slave communication circuits have respective first and second data ports connected to each other, and to a data port of the master circuit, in series to form a daisy-chain network. When operated in an addressing mode, the master circuit connects the data port to a ground voltage. When operated in the addressing mode, the slave circuits determine an address of the slave communication circuit based on a first voltage on the first data port, determined with the first data port shorted to the second data port, and based on a second voltage on the second data port, the second voltage determined with a voltage potential being provided between the first and second data ports.

In some embodiments, a method is provided for addressing a plurality of slave circuits having first and second data ports connected together in series to form a daisy-chain network. At a master circuit, the daisy-chain network is connected to a reference voltage (e.g., a ground voltage). At each of the plurality of slave circuits a switch, connected between the first and second data ports, is operating in a closed state and a first voltage is measured at one of the first and second data ports. After measuring the first voltage, the switch is operated in an open state, which causes a voltage potential to be provided between the first and second data ports. A second voltage is measured at one of the first and second data ports with the switch operating in the open state. An address for the slave circuit is then determined based on the first and second voltages.

Various example embodiments are directed to circuits, networks, systems, and approaches that address challenges including those discussed above.

Aspects of the present disclosure may be more completely understood in consideration of the detailed description of various embodiments of the present disclosure that follows in connection with the accompanying drawings, in which.

Figure 1A:
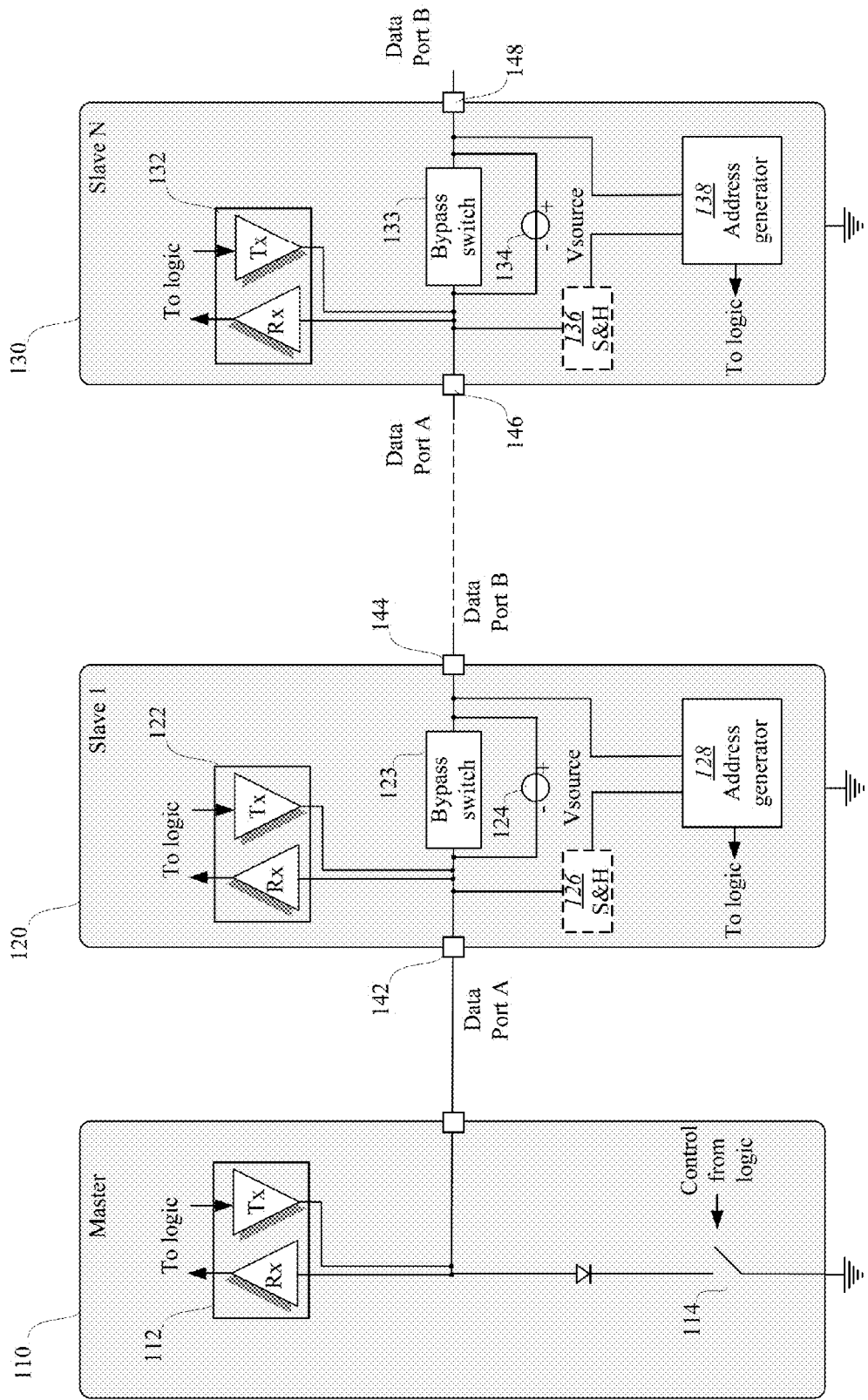
FIG. 1A shows a block diagram of a network of N communication circuits configured in accordance with one or more embodiments.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims.

Aspects of the present disclosure relate to the addressing of communication circuits in a communication network. In one embodiment, a communication circuit that is configured for automated addressing of communication circuits in a series connected network of the communication circuits is provided. The communication circuit includes a voltage source and a switch connected in parallel between first and second data ports of the circuit. The first and second data ports may be connected with first and second data ports in a series coupled network. For ease of reference, the series coupled network may be referred to as a daisy-chain network and such terms are used interchangeably herein. The communication circuit includes a switch to facilitate addressing of the circuit. The switch is configured to allow the communication circuit to selectively disconnect the first and second data ports from each other. The switch can thus cut off communications to further communication circuits in the series connected network. The communication circuit includes a voltage source connected in parallel with the switch. When the switch is operated in a closed state (i.e., a conductive state), a conductive path is provided between the first and second data ports and voltage potential is removed between the data ports. When the switch is operated in an open state (i.e. a non-conductive state), conductivity of the path formed via the switch is reduced, which permits the voltage source to cause a voltage potential to form between the first and second data ports.

The circuit includes an addressing circuit configured to assign an address in the network to the communication circuit when the circuit is operated in an addressing mode. The address is determined based on a first voltage of the first data port (measured when the switch is closed), and a second voltage of the second data port (measured when the switch is open).

In some embodiments, the communication circuit is configured to enter the addressing mode automatically when powered on or connected to the bus. In some other embodiments, the communication circuit enters the addressing mode in response to a command signal from a master communication circuit connected to the bus. In some embodiments, after assigning the address to the communication circuit, the circuit is configured to operate in a communication mode, in which the switch is operated in the closed state.

In some embodiments, in response to powering on the communication circuit, the communication circuit is configured to transmit a command signal on the first and second data ports and enter the addressing mode. The command signal is configured to cause other communication circuits in the network to enter the addressing mode and recalculate their address.

In a particular embodiment, a daisy-chain network of communication circuits is provided. The network includes a master communication circuit and a plurality of slave communication circuits connected together in a daisy-chain arrangement. The slave communication circuits have respective first and second data ports connected to each other, and to a data port of the master circuit, in series to form the daisy-chain network. The master and slave circuits are configured to operate in respective addressing and communication modes. When operating in the communication mode, the respective switch between first and second data ports of each slave is closed to link together the master and slave circuits in series to form an unbroken conductive path (referred to as a communication bus) spanning the entire chain of communication circuits in the network. When operating in the addressing mode, the master circuit ties the communication bus to ground voltage and a first voltage is measured in each slave circuit. The switch between first and second data ports, in each slave circuit, is then opened to provide a voltage potential between the each first and second ports. Because the voltage potentials of slave circuits are connected in series and referenced to the ground voltage by the master circuit, the second data port of each slave circuits is set to a unique second voltage that may be used for addressing. For instance, in one embodiment, a unique address is determined by each slave circuit based on a difference between the first and second voltages of the slave circuit.

In another embodiment, a slave circuit in a daisy chain network includes a switching circuit configured to operate in a communication mode and an addressing mode. In the communication mode, the switching circuit communicates information carried by data signals between a first data port and a second data port to provide an unbroken signal path that may be used as a bus for communication between various circuits in the network. While operating in the addressing mode, the switching circuit receives a first information signal that represents a cascade of a subset of the slave circuits preceding the slave circuit in the daisy-chain. For instance, the first information signal may indicate a position of the slave circuit in the network or indicate a number of slave circuits in communication mode between the master communication circuit and the first data port on the signal line. The switching circuit (e.g., 164 and 184) sends a second information signal to the next slave circuit in the network. The second information signal represents a cascade of a second sub-set of slave circuits that includes the first mentioned subset as well as the slave circuit. For the next slave circuit in the daisy chain, the second information signal is indicative of, e.g., a position of the next node in the network or a number of slave circuits preceding the next node in the network. Based on the first or second information signals, an address may be determined for the slave circuit in the daisy-chain network.

The various embodiments are thought to be applicable to a number of different networks and applications. For instance, some embodiments may perform address assignment for communication circuits connected on a LIN bus or another system bus, such as a bus for automotive and aeronautical applications, manufacturing equipment, heating, ventilation and air conditioning (HVAC) type systems, and others. In various LIN applications, for instance, slaves may be identical, which can pose challenges with respect to identifying the respective slaves, such as by assigning unique addresses to slave circuits by a LIN master. The addressing performed by various ones of the embodiments may be used to avoid complications associated with addressing schemes in which addresses are assigned to LIN slave circuits by a LIN master circuit. For general information regarding LIN networks, and for specific information regarding aspects of LIN networks in which various example embodiments of the present invention may be implemented, reference may be made to the LIN Specification Version 2.0 (and other versions thereof), available from the LIN Consortium of Munich, Germany. Further, U.S. Pat. No. 7,884,744 (issued Feb. 8, 2011; De Hass, et al.) and U.S. Pat. No. 7,937,516 (issued May 3, 2011; Matthias Muth), each describe useful technical details, applications and various background information regarding LIN networks, and each of these documents is fully incorporated herein by reference.

Referring to the figures, FIG. 1A shows a block diagram of a network system, in accordance with one or more embodiments. The network includes a plurality of communication circuits including a master circuit 110 and N slave circuits (e.g., 120 and 130) connected in a series cascade arrangement (e.g., a daisy-chain arrangement). Each of the slave circuits includes a respective switch (e.g., 123 and 133) connected between a respective first data port and a second data port (e.g., 142 and 146, or 144 and 148). For ease of reference, the switch may be referred to as a bypass switch. Each of the slave circuits also includes a respective voltage source (e.g., 124 and 134) connected between the first and second data ports. The bypass switch is configured to allow the slave circuit to selectively disconnect the first and second data ports from each other. The respective bypass switches at each slave circuit can thus cut off communications to further slave circuits during the addressing procedure.

The slave circuit is configured to operate in a communication mode and an addressing mode. While operating in a communication mode, the bypass switch (e.g., 123 and 133) is closed to provide an unbroken signal path spanning the entire chain of communication circuits in the network. When operating in this mode, signals transmitted by the master or a slave circuit will be communicated to every other circuit in the network.

When closed, the bypass switch inserts a very low series resistance to create a conductive path between the first and second data ports. The closed bypass switch also substantially removes voltage potential between the first and second data port.

While operating in an addressing mode, the master circuit ties the data bus to a ground voltage, and the addressing circuit (e.g., 128 and 138) of each slave circuit causes the bypass switch (e.g., 123 and 133) to open to provide a voltage potential, via the voltage source (e.g., 124 and 134) between the first and second data ports. By applying a voltage potential between the data ports of each of the slave circuits (e.g., 120 and 130), data ports of different slave circuits will have different voltages. For example, if voltage sources 124 and 134 each provide a 2 volt potential, a first slave circuit 120 in the series will measure about 0 volts with respect to the ground voltage at data port 142 and about 2 volts at data port 144. For the second slave circuit in the series, the slave circuit will measure about 2 volts at a first data port and about 4 volts at a second port. Every successive slave circuit in the network will further increase the voltage by 2 volts at the corresponding second data port of the slave circuit. As a result, each slave circuit will have different voltages that can be used to determine a unique address for the slave circuit.

In one or more embodiments, upon entering an addressing mode, the addressing circuit (e.g., 128 and 138) causes a sample-and-hold circuit (e.g., 126 and 136) to measure and store a first voltage measured at the first data port (e.g., 142 and 146). The bypass switch (e.g., 123 and 133) is then opened to apply the voltage potential between the first and second data ports, and a second voltage at the second data port is compared to the first voltage by a addressing circuit (e.g., 128 and 138) to determine an address for the slave circuit.

It is recognized that in some alternative embodiments, the sample-and-hold circuit measures a voltage at the second data port to determine the first voltage for addressing. Likewise, in some embodiments, a voltage of the first data port is measured when the switch (e.g., 123 and 133) is open to determine the second voltage for addressing. For ease of explanation, examples and embodiments are primarily discussed with reference to the first voltage being measured at the first data port (e.g., 142 and 146) and the second voltage being measured at the second data port (e.g., 146 and 148).

In some embodiments, after assignment of addresses to the slave circuits, further action may be taken to communicate the assigned addresses to the master circuit. For instance, in one embodiment, a slave circuit may be configured to communicate the assigned address to the master circuit, via the transceiver circuit. Communication of assigned addresses to the master circuit may be performed in a number of ways, depending on the application. In one implementation, a slave circuit may be configured to communicate an assigned address to the master circuit, while operating in the communication mode in response to determining the address. In another implementation the slave circuit may be configured to communicate the assigned address to the master circuit while operating in the communication mode. In some embodiments, slaves are configured to automatically transmit the address to the master node. In some other embodiments, slaves transmit addresses to the master node in response to a command signal.

The master and slave circuits include respective transmitter and/or receiver circuits (e.g., 112, 122, and 132) configured to transmit and/or receive data on the network via the signal path. The transmitter/receiver circuits may operate using any one of a number of different communication protocols and signaling techniques depending on the application and the type of network. The communication protocol implemented by the transmitter/receiver circuits direct how signals are modulated and processed to represent various data values, and determine how and when the master and slave communication circuits are allocated time and/or frequencies to transmit signals on the unbroken signal path. For instance, in some particular embodiments, the transmitter/receiver circuits are configured to transmit and/or receive signals, via the signal path, according to the LIN protocol. In the LIN protocol, transmission by the slave circuits is controlled by the master. To allocate a transmission slot to a slave circuit, the master circuit transmits a message header containing the address of the slave circuit. In response, to a slave circuit receiving a message header from the master indicating its address, the slave transmits a message frame on the signal path. The master controls the sequencing of transmission slots to the slave circuits according to a scheduling table, which may be periodically modified as required in the particular application.

Figure 1B:
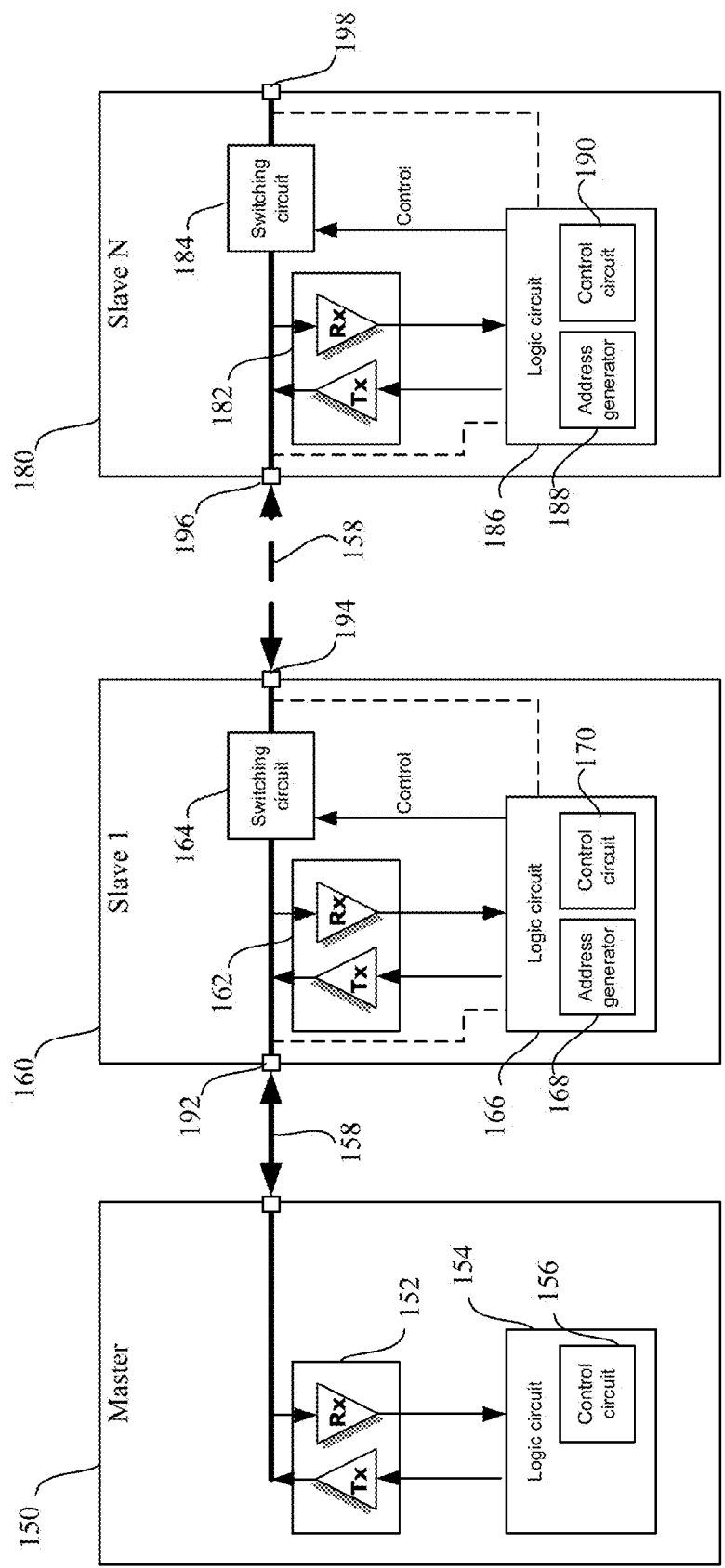
FIG. 1B shows a block diagram of a network of N communication circuits configured in accordance with one or more embodiments.

FIG. 1B shows a block diagram of a network system, in accordance with one or more embodiments. The network includes a master circuit 150 and N slave circuits (e.g., 160 and 180) connected in a series cascade arrangement (e.g., a daisy-chain arrangement). Each of the slave circuits includes a switching circuit (e.g., 164 and 184) connected between a respective first data port and a second data port (e.g., 192 and 194, or 196 and 198).

The switching circuit (e.g., 164 and 184) is configured to operate in a communication mode and an addressing mode. In the communication mode, the switching circuit communicates information carried by data signals between a first data port and a second data port. For instance, in one embodiment, the switching circuit provides a conductive path between the first and second data ports, while operating in the communication mode, to provide an unbroken signal path 158 that may be used as a bus to transmit signals between the master and slave circuits.

While operating in the addressing mode, the switching circuit receives a first information signal that represents a cascade of slave circuits located between the master communication circuit and the first data port on the signal line 158.

The switching circuit (e.g., 164 and 184) sends a second information signal (based on the first information signal and an internal voltage level) on the second data port (e.g., 194 and 198) to the next slave circuit in the series. For instance, in one embodiment, each of the slave circuits is configured to provide a voltage potential between the respective first and second terminals. Because the voltage potentials are connected in series by the signal line 158, the signal received at the first data port (e.g., 192 and 196) of a slave circuit (i.e., the first information signal) is the summation of voltage potentials provided other slave circuits, connected between the slave and the master, which are operating in the addressing mode. By applying a voltage potential between the first and second data ports, the switching circuit generates and sends a second information signal comprising the first information signal increased by the voltage potential.

Each slave circuit (e.g., 160 and 180) includes an address generation circuit (e.g., 168 and 188) configured to assign an address to the slave circuit based on the first or second information signals. For instance, in one embodiment, the first and second information signals may be determined by measuring a voltage at respective first and second data ports. Upon initially entering the communication mode, prior to applying the voltage potential, the master circuit may connect the signal line 158 to a reference voltage (e.g., a ground voltage) that may be used by the slave circuits as a reference voltage. In such embodiments, the address generation circuit of each slave circuit is configured to measure a voltage of the first or second data ports prior to the switching circuit applying the voltage potential. The address generation circuit determines an address of the slave circuit based on a difference of the voltage measured before applying the voltage potential and the voltage measures after applying the voltage potential.

The master and slave circuits (e.g., 150, 160, and 180) include respective transmitter/receiver circuits (e.g., 152, 162, and 182) configured to transmit and/or receive data on the network via the signal path 158. As described with reference to the transmitter/receiver circuits shown in FIG. 1A, the transmitter/receiver circuits may operate using any one of a number of different communication protocols and signaling techniques depending on the application and the type of network. For instance, in some particular embodiments, the communication circuits are configured to transmit and/or receive signals, via the signal path, according to the LIN protocol.

In some embodiments, after assignment of addresses to the slave circuits, further action may be taken to communicate the assigned addresses to the master circuit. For instance, in one embodiment, a slave circuit may be configured to communicate the assigned address to the master circuit, via the transceiver circuit. Communication of assigned addresses to the master circuit may be performed in a number of ways, depending on the application. In one implementation, a slave circuit may be configured to communicate an assigned address to the master circuit, while operating in the communication mode in response to determining the address. In another implementation the slave circuit may be configured to communicate the assigned address to the master circuit while operating in the communication mode. In some embodiments, slaves are configured to automatically transmit the address to the master node. In some other embodiments, slaves transmit addresses to the master node in response to a command signal.

The master and slave circuits include respective transmitter/receiver circuits (e.g., 112, 122, and 132) configured to transmit and/or receive data on the network via the signal path. The communication circuits may operate using any one of a number of different communication protocols and signaling techniques depending on the application and the type of network. The communication protocol implemented by the communication circuits direct how signals are modulated and processed to represent various data values, and determine how and when the master and slave communication circuits are allocated time and/or frequencies to transmit signals on the unbroken signal path. For instance, in some particular embodiments, the communication circuits are configured to transmit and/or receive signals, via the signal path, according to the LIN protocol. In the LIN protocol, transmission by the slave circuits is controlled by the master. To allocate a transmission slot to a slave circuit, the master circuit transmits a message header containing the address of the slave circuit. In response, to a slave circuit receiving a message header from the master indicating its address, the slave transmits a message frame on the signal path. The master controls the sequencing of transmission slots to the slave circuits according to a scheduling table, which may be periodically modified as required in the particular application.

The slave circuits (e.g., 160 and 180 include logic circuits (e.g., 166 and 186)) that implement the address generation circuits (e.g., 168 and 188) as well as control circuitry (e.g., 170 and 190) configured to monitor the signal line 158 for control signals and cause the switching circuit (e.g., 164 and 184), the addressing circuit (e.g., 168 and 188), and transmission/receiver circuits (e.g., 162 and 182) to operate in the communication and addressing modes. In some implementations, the logic circuit may be used to include logic implementing other functionality of the slave circuit. For instance, the logic circuit may be configured to monitor a temperature sensor, and periodically transmit temperature readings to the master circuit 150 while operating in a communication mode. In some other embodiments, the slave circuit may receive control data and/or data for transmission from an external circuit. For instance, an external logic circuitry (e.g., coupled to slave 160) may be configured to monitor a temperature sensor, and periodically transmit temperature readings to the slave circuit (e.g., 160). In response, the slave circuit forwards received temperature readings to the master circuit 150.

Figure 2:
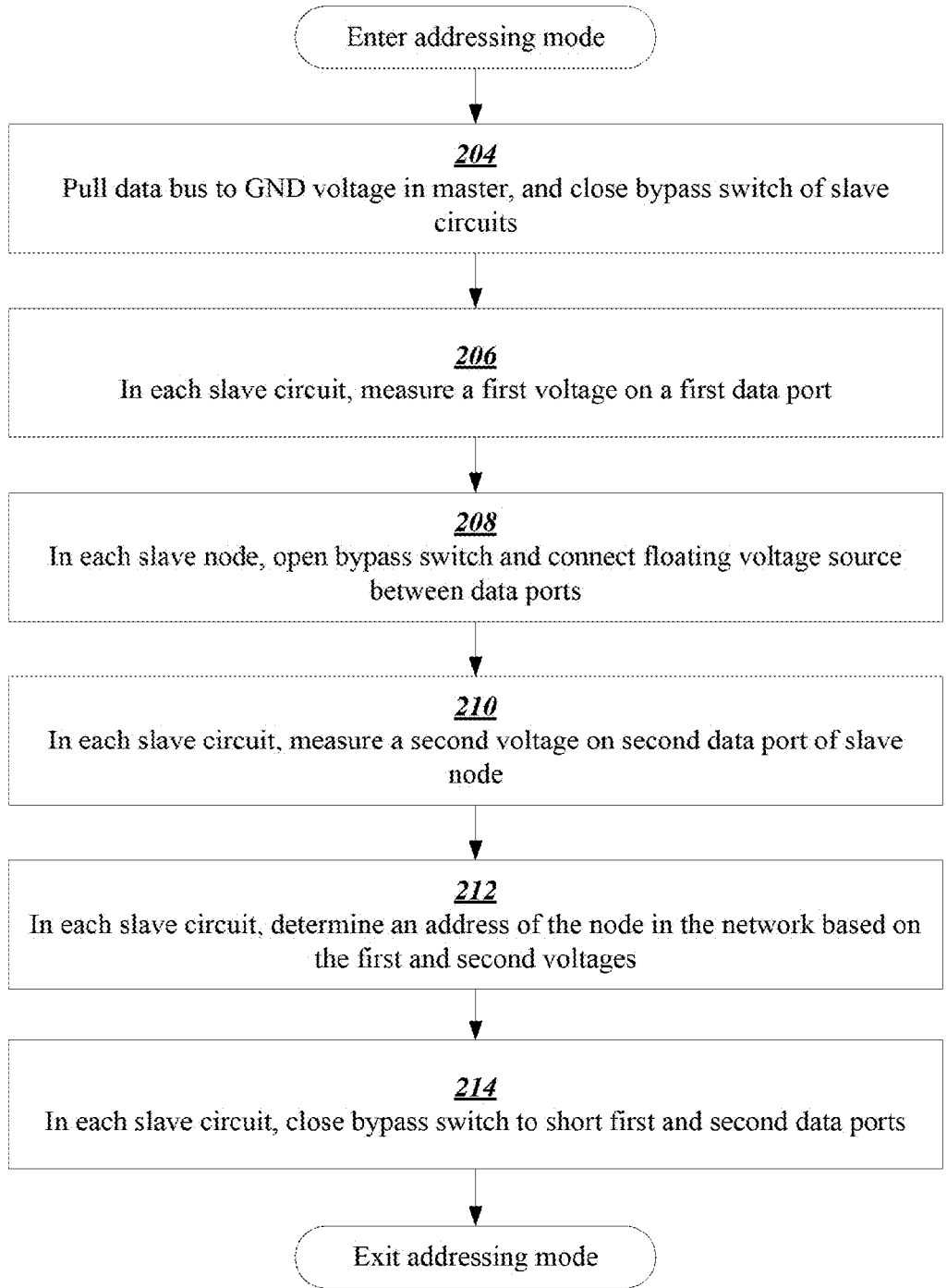
FIG. 2 shows a flow chart of a method for determining addresses of communication circuits in a network.

FIG. 2 shows a flow chart of a method for determining addresses of communication circuits in a daisy-chain network. The data bus is pulled to a ground voltage by the master circuit at block 204 and bypass switches of slave circuits are closed. Closing the bypass switches ties the entire bus to the ground voltage. In each slave circuit, a first voltage is measured at a first data port at block 206. In each slave circuit, the bypass switch is then opened at block 208 and a voltage potential is provided between the first and second data ports via the voltage source in each slave circuit. A second voltage at the second data port is measured at block 210.

By providing the voltage potential, the first slave circuit in the chain, starting at the master, increases the voltage on the bus by an amount $V_{source}$ provided by the voltage source of the slave circuit. Each successive slave circuit in the chain further increases the voltage on the bus by this amount. As a result, the second data port of each slave circuit is provided with a different voltage that can be used to determine unique addresses for the slave circuits on the bus. A network address of the circuit is determined based on the first and second voltages at block 212. After addressing is completed in each slave circuit, the respective bypass switches between the data ports are closed at block 214 to reconnect the data bus for communication and remove the voltage potential of the voltage source.

It is recognized that different implementations determine addresses based on measured voltages in a variety of ways. In one embodiment, an address of a slave circuit is determined by quantizing a difference between the first and second voltages. For instance, in one embodiment, the address of the slave circuit is determined by quantizing a difference between the first and second voltages divided by an amount of voltage provided by the voltage source of the slave circuit. In another embodiment, the address of the slave circuit is determined by quantizing a difference between the first and second voltages and dividing the difference by a number of slave circuits in the network. In such embodiments, the number of slave circuits in the network is determined in a number of ways for different implementations. For instance, in one implementation, the number of slave circuits is communicated to the slave circuits by a master circuit of the network. In another implementation, the number of slave circuits in the network is stored in a non-volatile memory of each slave circuit. Some other implementations utilize other methods to disseminate the number of slave circuits in the network.

In some embodiments, the opening and closing of bypass switches and measuring of the first and second voltages is synchronized between different communication circuits, which is effected in a number of ways for different implementations. For instance, in one implementation, slave circuits are configured to wait a predetermined amount of time after sampling the first voltage a block 206 before opening the respective bypass switch at block 208. The predetermined amount of time helps to ensure that all slave circuits complete sampling of the first voltage before the bypass switches are opened. In another implementation, after measuring the first voltage at block 206, the slave circuits wait for a command signal to be received (e.g., from the master circuit) before proceeding to open bypass switches at block 208. Other methods for coordinating addressing steps shown in FIG. 2 between slave circuits are implemented with other embodiments.

It is recognized that the voltage range in which slave circuits are capable of measuring voltages of the first and second data ports may be limited to a maximum voltage. Because each additional communication circuit in the network adds an additional voltage to that measured by the preceding communication circuit in the network, there is a limited number of slave circuits that can be addressed using the method shown in FIG. 2 before the maximum voltage is exceeded. In some embodiments, addressing is performed over several of addressing rounds, where the process shown in FIG. 2 is repeated for unaddressed circuits remaining after the maximum measurable voltage is exceeded.

Figure 3:
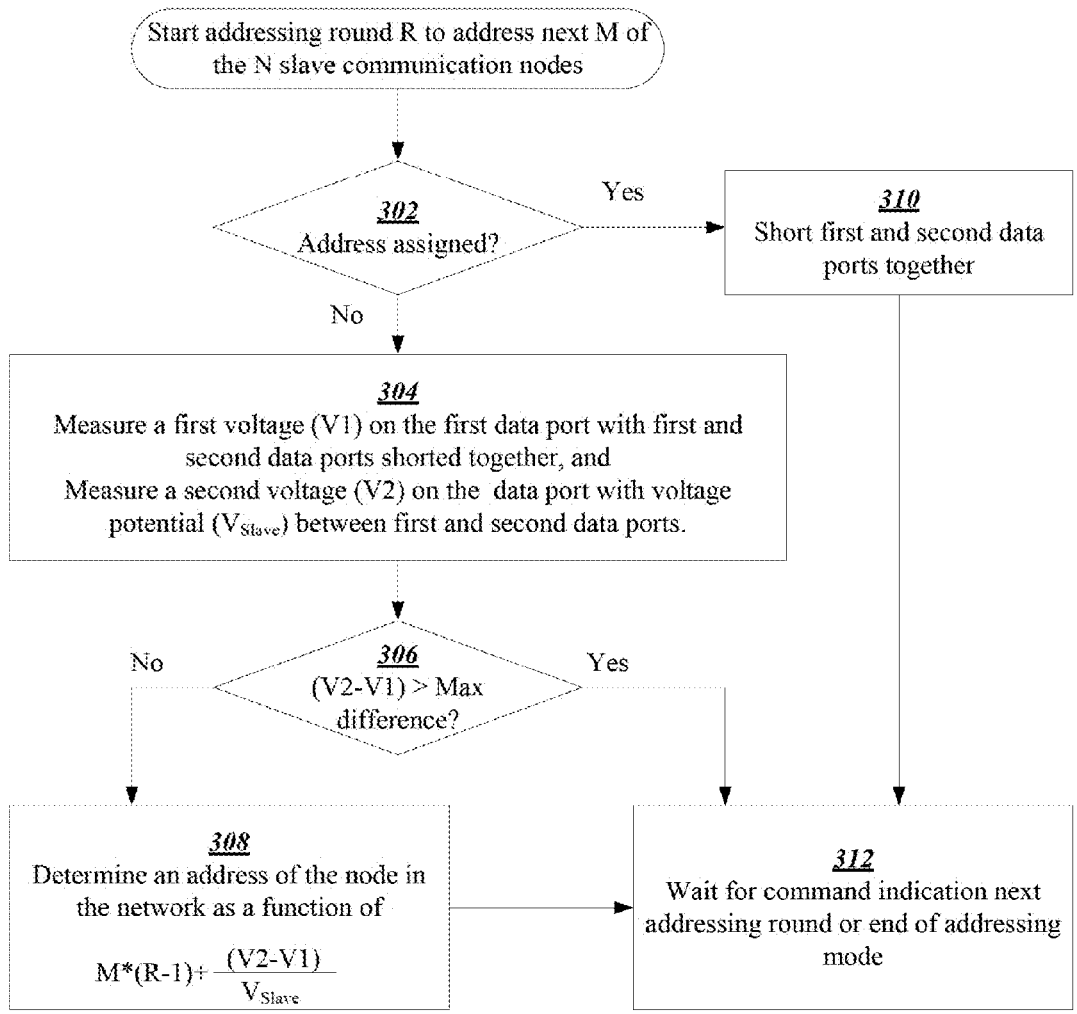
FIG. 3 shows a flow chart of a method for determining addresses of communication circuits over several rounds of addressing.

FIG. 3 shows a flow chart of a method for determining addresses of communication circuits over several rounds of addressing. In each round R ($1 \leq R \leq (N/M)$), M slave circuits are addressed. If an address of a slave circuit has not been determined as decision block 302, a voltage difference is determined at block 304, as described with reference to FIG. 2. A first voltage V1 is measured on a first data port, a voltage potential is applied between the first and second data ports, and a second voltage V2 is measured on the second data port. If the voltage difference (i.e., V2−V1) is less than or equal to the maximum measurable voltage at decision block 306, the address is determined as a function of the difference and R at block 308. For instance an address of the slave circuit is given by, $$M*(R-1) + \frac{(V2-V1)}{Vslave}$$

where R indicates the current round, V1 indicates the first voltage, V2 indicates the second voltage, M indicates the number of communication circuits to be addressed in each round, and Vslave indicates the voltage potential provided between the first and second data ports. After determining the address, the slave circuit waits at block 312 for a command indicating the next addressing round or end of the addressing mode. If the voltage difference (i.e. V2−V1) is greater than the maximum measurable voltage at decision block 306, the slave circuit will be addressed in a subsequent round of addressing. For instance, in one implementation the maximum measurable voltage is equal to M*Vslave.

In subsequent rounds, the addressed slave circuit will close the respective bypass switch between its first and second data ports at block 310 to remove voltage potential provided by the slave circuit from the bus. After closing the bypass switch, the addressed slave circuit waits at block 312 for a command indicating the next addressing round or end of the addressing mode.

Additional rounds of addressing are initiated in a number of ways for different implementations. For instance, as shown in FIG. 3, slave circuits wait for a command signal communicated on the network to initiate another round of addressing. In some other embodiments, slave circuits wait at block 312 for a pre-determined amount of time to allow the addressing round to be completed and then automatically proceed with subsequent round addressing after the time expires. Some other embodiments utilize other schemes for initiating additional addressing rounds.

In some embodiments, the entire addressing procedure is repeated multiple times to verify that the determined address is the same when repeated. For instance, in one embodiment, addressing is repeated to determine a set of addresses for each slave circuit. In some implementations, a majority vote is used to select an address for the slave circuit from the set of addresses.

Figure 4:
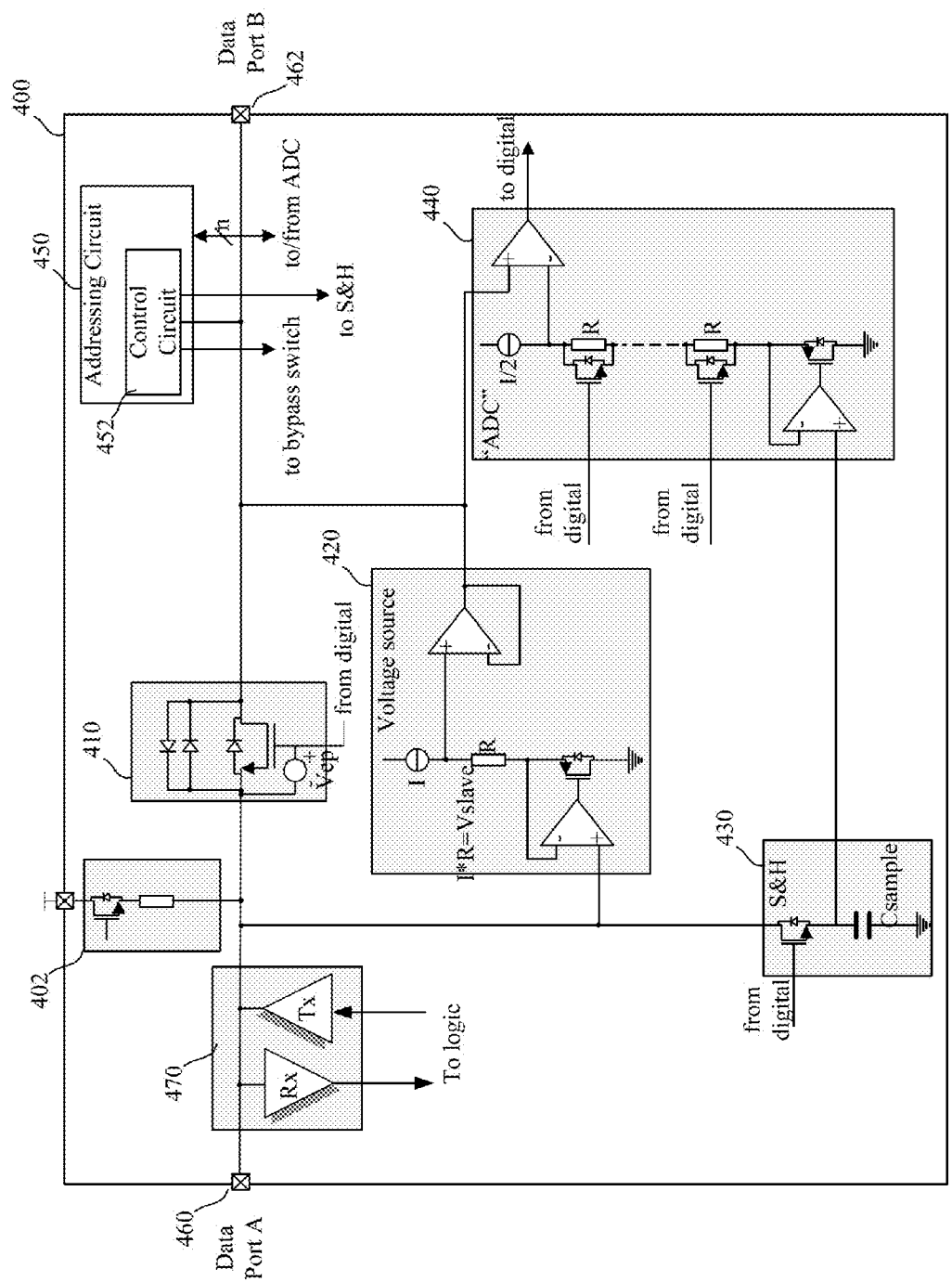
FIG. 4 shows a communication circuit that may be used in a network, in accordance with one or more embodiments of the present disclosure.

FIG. 4 shows a communication circuit, in accordance with one or more embodiments. The communication circuit may, for instance, be used to implement one of the slave circuits shown in FIG. 1. The communication circuit includes a switch 410 connected between the first and second data ports (460 and 462). Different types of switches may be used to implement switch 410 depending on the particular application. In some implementations, a MOSFET based transistor is used to implement switch 410. The MOSFET based switch operates in a closed (i.e., conductive) state when a voltage is applied to a gate of the MOSFET that is sufficient to operate the MOSFET in a saturation region. The MOSFET based switch operates in an open (i.e., non-conductive) state when a voltage is applied to a gate of the MOSFET that is sufficient to cause current through the MOSFET to equal a leakage current of the MOSFET. In this example, the switch 410 is a low-voltage switch protected by two diodes placed anti-parallel to the switch. The term "anti-parallel" as used in the context of connecting diodes is defined as connecting diodes to common circuit nodes, in opposing directions. The switch 410 can be, for instance, an NMOS transistor with a charge pump as shown in FIG. 4.

A voltage source 420 is connected in parallel with the switch 410. The voltage source provides a floating voltage potential between the first and second data ports when the switch 410 is open. In this example, the voltage is generated by passing current "I" through resistor "R" with operational amplifiers used to reference the negative terminal of the voltage source to the first data port 460 and provide the voltage produced across resistor R to the second data port 462.

In this example, a sample-and-hold circuit 430 is configured to sample a voltage at the first data port. For instance, in one implementation, the sample-and-hold circuit 430 includes a capacitor (Csample) with a series switch as well as a switch to selectably connect the capacitor to the first data port to sample the first voltage, as shown in FIG. 4. Analog-to-digital converter (ADC) circuit 440 is configured to determine and quantize a difference between the voltage held by the sample-and-hold circuit 430 and a voltage at the second data port 462. In the example shown in FIG. 4, the ADC circuit 440 implements a comparator with an adjustable trip level. The comparator trip level is controlled by control circuit 452 of the communication circuit 400. The communication circuit 400 includes an addressing circuit 450 configured to receive the output of the ADC circuit 440 and determine an address for the communication circuit 400 in the network, as described above. In some other embodiments, the difference between the voltages is determined by a comparator and the result quantized with an ADC circuit.

The addressing circuit 450 includes a control circuit 452, which controls the switch 410, the sample-and-hold circuit 430, and the ADC circuit 440. In this example, the communication circuit 400 also includes a termination circuit 402 implemented by a pull-up circuit coupled to the first data port 460. The termination circuit selectably disconnects the data port from a voltage source in response to a command by the control circuit 452.

As described above, the control circuit operates the slave circuit in a communication mode and in an addressing mode. Upon entering the addressing mode, the control circuit causes the termination circuit 402 to disconnect from the first data port 460, and causes the sample-and-hold circuit 430 to sample a first voltage at the first data port 460. After a certain amount of time the control circuit causes switch 410 to open to provide a voltage potential of the voltage source 420 between the first and second data ports (460 and 462). The control circuit 452 causes ADC circuit 440 to determine and quantize a difference between the first voltage held by sample-and-hold circuit 430 and a second voltage at the second data port 462. The addressing circuit 450 determines an address of the communication circuit 400 based on the quantized difference output from the ADC circuit 440 as described, e.g., with reference to FIGS. 1-3.

In some embodiments, the communication circuit is implemented without sample-and-hold circuit 430. For instance, in some embodiments, an ADC is configured to separately quantize the first and second voltages and provide the quantized values to the addressing circuit 450, which determines an address based on the two quantized voltages.

The communication circuit includes a transmitter/receiver circuits 470 configured to transmit and/or receive data on the network via a signal path provided by data ports 460 and 462. As discussed with reference to FIGS. 1A and 1B, the transmitter/receiver circuits may operate using any one of a number of different communication protocols and signaling techniques depending on the application and the type of network. Data communication on a daisy-chain network can use analog, digital, RF, serial and/or parallel communication techniques. For certain high-speed applications, different types of modulation schemes can be used for carrying information across the isolation region, including but not limited to OOK (on-off keying), amplitude, phase-based, and/or frequency-based. In some instances, communications can be carried out between multiple circuits placed within a single chip-package (e.g., BGA package) and also having galvanic isolation there between. The various communications can be carried out using different isolation buffer circuits and amplifiers. Various applications are also contemplated including, but not limited to, applications in which small voltage differences exist between transmitters and receivers and applications in which large voltages can exist (e.g., a hundred volts or more as can occur in automotive applications with different batteries). Consistent with one or more embodiments discussed herein, U.S. Pat. No. 6,920,576 (filed May, 31, 2001; Ehmann, Gregory E.), U.S. Pat. No. 6,882,046 (filed Dec. 18, 2001; Davenport, et al.) and "Signal Isolation Buffer Amplifiers" Burr-Brown, ISO102, ISO106, January 1997, each describe useful technical details, applications and various background information, and each of these documents is fully incorporated herein by reference.

In some embodiments, the master and slave circuits may be galvanically isolated from each other. For instance, some applications implement high and low voltage domains that must be isolated from each other to avoid damage of electronics from current surges and high voltage transients. As a result of such isolation, the circuits operate in separate voltage domains that are not referenced to one another by a common ground voltage level. Galvanic isolation may be provided using a number of different methods including, but not limited to, capacitive coupling, inductive coupling, and/or optical coupling of signals between slave circuits in a daisy-chain network.

The various controllers, logic circuits, and control methods described herein can be implemented using a variety of devices and methods. For example, logic or processing circuits can be implemented using one or more of: discrete logic circuitry, fully programmable and semi-programmable circuits such as PLAs (programmable logic arrays), specialized processors, or general-purpose processors that are specially programmed. Combinations of these and other circuit components are also possible and within the scope of various embodiments, including those discussed above.

The embodiments are thought to be applicable to a variety of networking applications. Other aspects and embodiments will be apparent to those skilled in the art from consideration of the specification. While the present disclosure is amenable to various modifications and alternative forms, specifics thereof have been shown by way of example in the drawings and will be described in further detail. It should be understood that the intention is not to limit the disclosure to the particular embodiments and/or applications described. On the contrary, the intention is to cover all modifications, equivalents, and alternatives falling within the spirit and scope of the present disclosure.

What is claimed is:

1. An apparatus operable as a terminal for use in a master-slave network having a master communication circuit and having a plurality of slave communication circuits respectively operable as serially-connected communication circuits, the apparatus comprising:

a switching circuit configured and arranged to operate in a communication mode, in which the switch communicates information carried by data signals between a first data port and a second data port, and operate in an addressing mode, in which the switching circuit receives a first information signal having a voltage level that represents a cascade of slave circuits of the plurality of slave circuits in series between the master communication circuit and the first data port, and sends a second information signal on the second data port, the second information signal being generated by applying a voltage potential between the first and second data ports thereby modifying the voltage level of the first information signal;

an address generation circuit configured and arranged to generate an address for the apparatus based on a voltage difference between a voltage level on the first data port in the communication mode and the voltage level of the first information; and a circuit configured and arranged to communicate by using a protocol in which the address identifies the apparatus irrespective of other slave communication circuits in the network in communications with the first data port.

2. The apparatus of claim 1, wherein the switching circuit includes:
a voltage source having a first terminal connected to the first data port and a second terminal connected to the second data port; and
a switch connected in parallel with the voltage source, the voltage source providing a voltage potential equal to a voltage level between the first and second data ports when the switch is open, and the switch removing the voltage potential between the first and second data ports when closed.

3. The apparatus of claim 2, wherein:
the second information signal is a voltage at the second data port with the switch open; and
the address generation circuit is configured to determine the address based on a difference between the voltage at the second data port with the switch open and a voltage at the first data port with the switch closed.

4. The apparatus of claim 1, wherein the second information signal is a summation of a voltage level provided by an internal voltage level and a voltage level provided by the first information signal.

5. The apparatus of claim 1, wherein the first information signal changes based on how many of the plurality of slave communication circuits are included in the cascade of slave circuits.

6. A communication circuit configured for automated addressing in a network of communication circuits including a master circuit and a plurality of slave circuits connected in a series cascade arrangement, the circuit comprising:
a switch connected between first and second data ports and configured and arranged to
operate in a first state in which the switch is conductive between the first and second data ports to provide a first parameter at the second data port, and
operate in a second state, different from the first state, in which opening the switch effects a change at the second data port from the first parameter to a second parameter; and
an addressing circuit configured and arranged to assign an address in the network to the communication circuit based on respective values of
a first voltage of the first data port with the switch in the first state, the first voltage being representative of a voltage across other communication circuits in a network connected via the first and second data ports, and
a second voltage of the second data port with the switch in the second state, the second voltage being representative of a voltage between the second data port and other communication circuits in the network located between the communication circuit and the master circuit in the series cascade arrangement.

7. The communication circuit of claim 6, wherein the addressing circuit is configured and arranged to:
enter an addressing mode in response to a command signal, and operate the switch in the second state in the addressing mode; and enter a communication mode after assigning the address to the communication circuit, and operate the switch in the first state in the communication mode.

8. The communication circuit of claim 7, further including:
a pull-up circuit connected between the first data port and a supply voltage; and
wherein the addressing circuit is further configured and arranged to cause the pull-up circuit to disconnect the first data port from the supply voltage while the addressing circuit is operating in the addressing mode.

9. The communication circuit of claim 7, wherein the addressing circuit is configured and arranged to, in response to powering on,
transmit the command signal on the first and second data ports; and
operate in the addressing mode.

10. The communication circuit of claim 6, wherein the addressing circuit is configured and arranged to determine the address based on a voltage difference between the first and second voltages.

11. The communication circuit of claim 10, wherein the addressing circuit is configured and arranged to determine the address based on the voltage difference divided by an amount of voltage provided by a voltage source connected in parallel with the switch.

12. The communication circuit of claim 10, wherein the addressing circuit is configured and arranged to determine the address based on the voltage difference divided by the number of communication circuits in the network of communication circuits.

13. The communication circuit of claim 10, wherein the addressing circuit includes:
a sample-and-hold (S&H) circuit having an input connected to the first data port;
an analog-to-digital converter (ADC) having a first input connected to an output of the S&H circuit and a second input connected to the second data port; and
a control circuit configured and arranged to:
in response to a command signal, cause the switch to operate in the first state and cause the S&H circuit to sample the first voltage of the first data port and provide the first voltage at an output of the S&H circuit; and
after causing the S&H circuit to sample the first voltage, cause the switch to operate in the second state and cause the ADC to determine the difference between the first and second voltages.

14. The communication circuit of claim 13, wherein:
the control circuit includes a timer; and
the control circuit is configured and arranged to cause the switch to operate in the second state and cause the ADC to determine the difference between the first and second voltages, only in response to the timer indicating a length of time has passed after receiving the command signal, the length of time indicated by a value stored in a memory of the control circuit.

15. The communication circuit of claim 13, wherein the control circuit is configured to cause the switch to operate in the second state and cause the ADC to determine the difference between the first and second voltages, in response to a second command signal.

16. The communication circuit of claim 6, wherein:
the switch is a transistor;
while in the first state, the transistor operates in linear region; and while in the second state, current passed between the first and second data ports is equal to a leakage current of the transistor.

17. A daisy-chain network of communication circuits, comprising:
a master communication circuit having a data port and configured and arranged to connect the data port to a ground voltage in an address configuration mode; and
a plurality of slave communication circuits, each slave communication circuit having first and second data ports, the plurality of slave communication circuits being connected in a daisy-chain network to one another and to the data port of the master communication circuit, via the respective first and second data ports, each slave communication circuit being configured and arranged to, in the address configuration mode, assign an address of the slave communication circuit based on a first voltage on the first data port, determined with the first data port shorted to the second data port, and based on a second voltage on the second data port, the second voltage determined with a voltage potential being provided between the first and second data ports.

18. The daisy-chain network of communication circuits of claim 17, wherein the first voltage of each of the plurality of slave communication circuits is determined within a time period in which each of the plurality of slave communication circuits have the first data port shorted to the second data port.

19. The daisy-chain network of communication circuits of claim 18, wherein the second voltage of each of the plurality of slave communication circuits is determined within a second time period in which each of the plurality of slave communication circuits have a respective voltage potential provided between the first and second data ports.

20. The daisy-chain network of communication circuits of claim 17, wherein the plurality of slave communication circuits are configured and arranged to assign the respective addresses over two or more iterations of an addressing process, in each of the two of more iterations of the addressing process, each slave communication circuit having an assigned address is configured and arranged to short the first and second data ports together; and
in each of the two of more iterations of the addressing process, each slave communication circuit not having an assigned address is configured and arranged to:
determine a difference ($V_{Diff}$) between the first and second voltages;
in response to $V_{Diff}$ being less than a threshold difference ($V_{Thr}$), assign the respective address of the slave communication circuit based on $V_{Diff}$; and
in response to the difference being greater than or equal to the threshold difference, causing the plurality of slave communication circuits to perform another iteration of the addressing process.

21. The daisy-chain network of communication circuits of claim 20, wherein:
for an iteration (R) of the two of more iterations, in response to $V_{Diff}$ being less than $V_{Thr}$, the slave communication circuit is configured and arranged to assign an address to the slave circuit having a value equal to $M*(R-1)+(V_{Diff}/V_{Pot})$, wherein $V_{Pot}$ is the voltage potential provided between the first and second data ports and wherein M is the number of the slave communication circuits addressed in the iteration R.

22. A method of addressing a plurality of slave circuits having first and second data ports connected together in series to form a daisy-chain network, the method comprising:
at a master circuit, connecting the daisy-chain network to a reference voltage;
at each of the plurality of slave circuits:
with a switch connected between the first and second data ports operating in a closed state, measuring a first voltage at one of the first and second data ports;
after measuring the first voltage, operating the switch in an open state and provide a voltage potential between the first and second data ports, and measuring a second voltage at one of the first and second data ports with the switch operating in an open state; and
determining an address for the slave circuit based on the first and second voltages.

23. The method of claim 22, wherein the determining of the address is based on a difference between the first and second voltages divided by an amount of voltage provided by a voltage source.

24. The method of claim 22, wherein the determining of the address is based on a difference between the first and second voltages divided by the number of slave circuits in the plurality of slave circuits.

25. The method of claim 22, further comprising: in response to determining the address, closing the switch and entering a communication mode of operation.

* * * * *